United States Patent
Hybarger et al.

[15] 3,648,541
[45] Mar. 14, 1972

[54] EMERGENCY BRAKE WITH TOGGLE LOCK PAWL

[72] Inventors: Kenneth C. Hybarger, Jackson, Mich.; Joseph R. Kirk, deceased, late of Jackson, Mich., by Agnes R. Kirk, special Administratix, Jackson, Mich.

[73] Assignee: Hancock Industries, Inc., Jackson, Mich.

[22] Filed: Apr. 23, 1970

[21] Appl. No.: 31,233

[52] U.S. Cl. .................................................74/540
[51] Int. Cl. ...............................................G05g 5/24
[58] Field of Search ............74/535, 534, 541, 542, 540, 74/577 M

[56] References Cited

UNITED STATES PATENTS

| | | | |
|---|---|---|---|
| 2,995,047 | 8/1961 | Hinsey | 74/540 |
| 3,186,253 | 6/1965 | Ramillon | 74/540 |
| 3,216,276 | 9/1965 | Nagy | 74/534 |
| 2,467,557 | 4/1949 | Jandus | 74/535 |

FOREIGN PATENTS OR APPLICATIONS

| | | | |
|---|---|---|---|
| 276,670 | 1927 | Great Britain | 74/512 |
| 1,095,140 | 1954 | France | 74/577 M |

*Primary Examiner*—Milton Kaufman
*Attorney*—Beaman & Beaman

[57] ABSTRACT

A brake actuator of the type used to operate vehicle emergency brakes wherein the actuator includes a pivotally mounted lever having ratchet teeth defined thereon. The lever is restrained against movement in a brake releasing direction by a pawl engaging the lever ratchet teeth, the pawl being pivotally mounted upon a pivotally mounted support wherein the pawl comprises a toggle, and a cam surface is employed in the release structure to minimize the force required to release the locked pawl. The toggle-type pawl permits the pawl teeth to "unroll" during disengagement of the pawl and ratchet teeth, and the double pivot mounting of the pawl makes it possible for several pawl teeth to simultaneously effectively engage the ratchet teeth.

14 Claims, 8 Drawing Figures

INVENTORS
KENNETH C. HYBARGER
JOSEPH R. KIRK, DEC'D
AGNES R. KIRK, SPEC. ADMRX
BY Beaman & Beaman
ATTORNEYS

INVENTORS
KENNETH C. HYBARGER
JOSEPH R. KIRK, DEC'D
AGNES R. KIRK, SPEC. ADMRX

BY Beaman & Beaman
ATTORNEYS

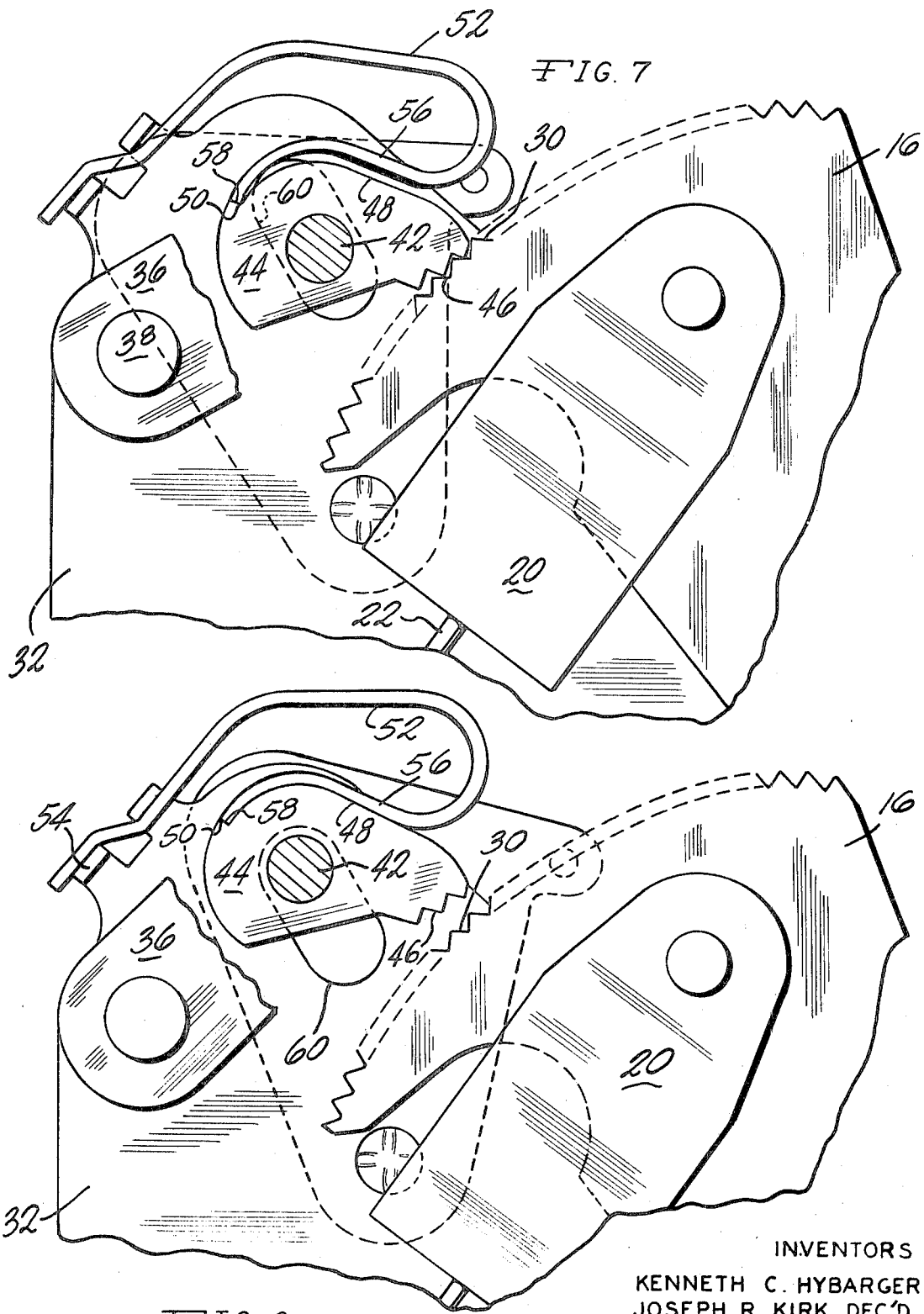

EMERGENCY BRAKE WITH TOGGLE LOCK PAWL

BACKGROUND OF THE INVENTION

The invention pertains to the field of releasable brake actuators utilizing a pivoted lever connected to a brake cable or other brake associated structure. Ratchet teeth are defined on the lever and a toggle type dog or pawl is utilized to maintain the lever in the desired brake applying position.

Emergency brake actuation devices in automobiles and light trucks usually include a lever, either hand or foot operated, which is pivoted to tighten the emergency brake cable to set the rear brakes. The conventional means for holding the brake lever in the brake cable tensioned position is a dog or pawl which engages ratchet teeth formed on the lever.

While conventional pawl releasing apparatus permit disengagement of the actuating lever teeth, and the teeth of the pawl, considerable force is often required to release emergency brakes due to the high friction forces existing at the lever and pawl teeth. This releasing force is often objectionable to women, as the brake release device must be manually operated. Additionally, since the forces existing between the lever ratchet teeth and the pawl, during braking, are considerable, a great deal of wear and friction occurs between the ratchet and pawl teeth during disengagement thereof. Thus, it is not uncommon for the ratchet teeth, or pawl teeth, to become worn to the extent that proper operation of the brake lever is no longer possible, and the ratchet and pawl tooth engagement is insufficient to hold the desired position of the lever.

One of the reasons for the creation of high release forces in the pawl releasing operation of brake structure of this type lies in the sliding friction existing between the ratchet lever and pawl teeth during disengagement. In addition to the wear produced during the unlocking of the pawl, the forces required to produce this sliding action sometimes require mechanical augmenting features in the release mechanism, adding to the cost of the brake actuator. This sliding action has a tangential motion which cannot be obtained with multiple pawl teeth.

The wear on the pawl and ratchet lever teeth can be reduced if, during locking, a plurality of pawl teeth engage with a plurality of ratchet lever teeth. While this arrangement reduces the contact area pressure on the pawl teeth, it limits the disengaging motion of the pawl when using conventional pawl constructions.

SUMMARY OF THE INVENTION

It is a purpose of the invention to provide a brake actuator utilizing a lever having ratchet teeth defined thereon which is locked in the desired position by a toggle pawl arrangement wherein a considerable reduction in the manual force required to release the lever is achieved, even under maximum brake producing conditions.

A further object of the invention is to provide a brake actuator employing a pawl wherein an improved angle of force application within the pawl exists which minimizes tooth wear during disengagement, yet permits a plurality of ratchet lever and pawl teeth to simultaneously engage. The pawl arrangement of the invention, wherein a toggle type construction is utilized, permits an unusual motion of the pawl and pawl teeth during unlocking.

Conventional brake actuating mechanisms utilizing ratchet levers and pawls require a relative sliding movement between the ratchet lever and pawl teeth during disengagement, and it is one of the objects of the invention to reduce this type of high wear producing relationship by permitting the pawl to move through a path of movement wherein the pawl teeth "unroll" from the lever ratchet teeth, thereby reducing wear and friction producing relationships.

In the practice of the invention, the brake cable is attached to a pivotally mounted lever having a portion adapted to be manually engaged, usually by the foot, whereby the lever may be pivoted to tension and set the vehicle emergency or parking brakes. Pawl structure is utilized to maintain the lever in the desired brake locking position, and ratchet teeth are formed on the lever for engagement with the pawl. The pawl is of a toggle-like construction wherein a pawl supporting lever is pivotally mounted with respect to support structure, and the pawl itself is pivotally mounted upon this supporting lever. Pivoting of the pawl support is accomplished by means of a cam surface defined on a pivotally mounted release lever which is manually pivoted. The configuration of the cam surface is such that a high mechanical advantage in the release mechanism is achieved which minimizes the force required to disengage the pawl from the lever ratchet teeth. The configuration of the pawl, and the location of the pivots for the pawl support lever, and the mounting of the pawl upon the pawl support lever, are such that as the pawl support lever and pawl are moved away from the actuating lever ratchet teeth during the unlocking operation the pawl is capable of pivoting relative to the pawl support and thereby "unrolls" from the actuating lever ratchet teeth. This type of movement minimizes relative wear between the engaged pawl and ratchet teeth. Additionally, the aforementioned relationships permit an effective engagement between a plurality of pawl and lever ratchet teeth, thereby reducing the contact area pressure on the pawl teeth.

The pivot on the pawl support lever upon which the pawl is mounted is provided with an extension which is received within a cam slot defined in the release lever, and in this manner the structure of the actuator is simplified, and a direct application of forces from the release lever cam surface to the pawl is provided. The disclosed structure is such that the application of force to the pawl and associated structure minimize bending forces on the components and insures a long effective operating life.

Another feature of the invention lies in the use of a single spring of unique configuration wherein the spring simultaneously biases the pawl support lever toward the actuating lever ratchet teeth, and imposes a dual biasing force on the pawl tending to pivot the pawl to a "normal" position on its pivot pin when the pawl is displaced in opposite directions during setting and release of the brake actuating lever.

BRIEF DESCRIPTION OF THE DRAWINGS

The aforementioned objects and advantages of the invention will be appreciated from the following description and accompanying drawings wherein:

FIG. 7 is an enlarged view of the lever ratchet teeth and pawl, somewhat similar to FIG. 5, illustrating the relationship between the pawl and ratchet lever teeth during partial disengagement thereof, and FIG. 8 is a view similar to FIG. 7 illustrating complete disengagement between the pawl and lever ratchet teeth.

DESCRIPTION OF A PREFERRED EMBODIMENT

Figure 1:
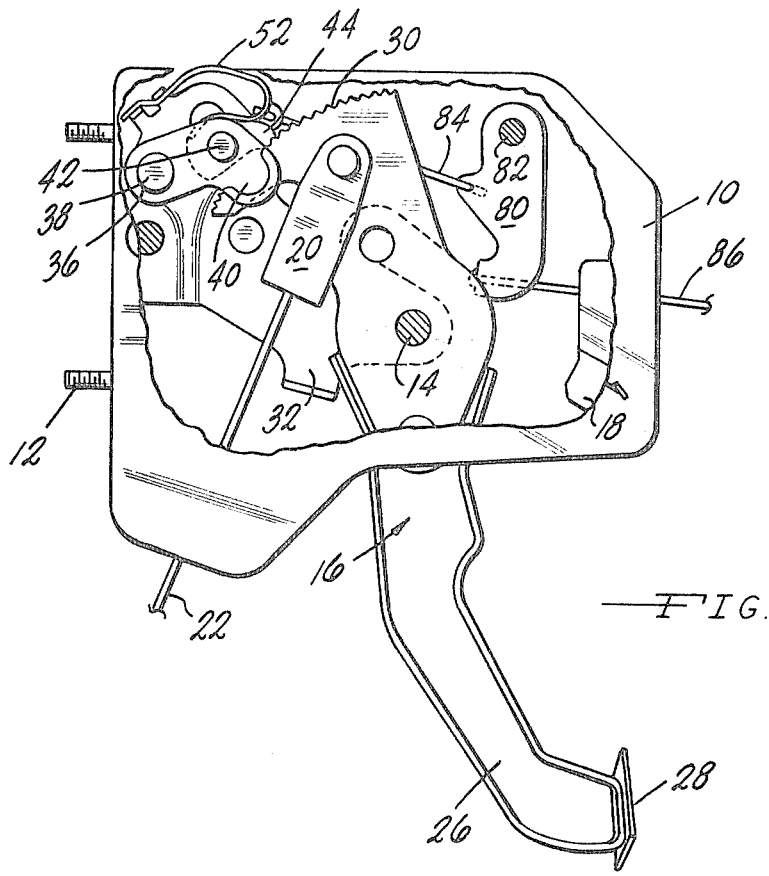
FIG. 1 is an elevational view of brake structure in accord with the invention, shown in the brake locking position, portions of the support member plate being broken away for the purpose of illustration.
Figure 4:
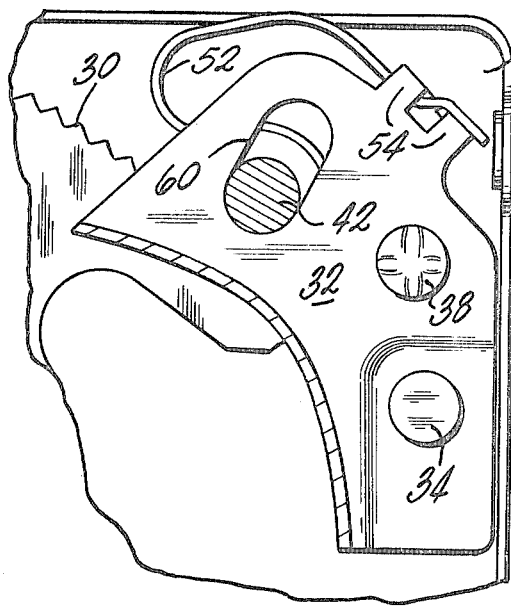
FIG. 4 is an enlarged, detail, elevational sectional view taken along section IV—IV of FIG. 3.

In the manufacture of automobiles and light trucks it is common practice to locate the actuator for the emergency or parking brakes beneath the vehicle dashboard, usually at the left of the driver, and the brake structure shown in the drawings is intended to be mounted in this location. The illustrated brake actuator is intended to be foot operated, although it will be appreciated that the inventive concepts may also be used in a hand operated embodiment.

The brake actuator structure disclosed includes a flanged support plate 10 which may be of stamped sheet metal which is mounted to the vehicle fire wall, or other structure, by means of a pair of threaded studs 12 extending from the plate. The plate 10 includes a primary pivot pin 14 upon which the actuating lever 16 pivots, and as is conventional practice, a rubber bumper stop 18 is mounted upon the support member plate for engagement by the lever upon release thereof.

A clevis 20 is pivotally mounted upon the lever 16 and the parking brake cable 22 is connected to the clevis and extends through a hole 24 defined in the flange of the support plate 10.

Figure 2:
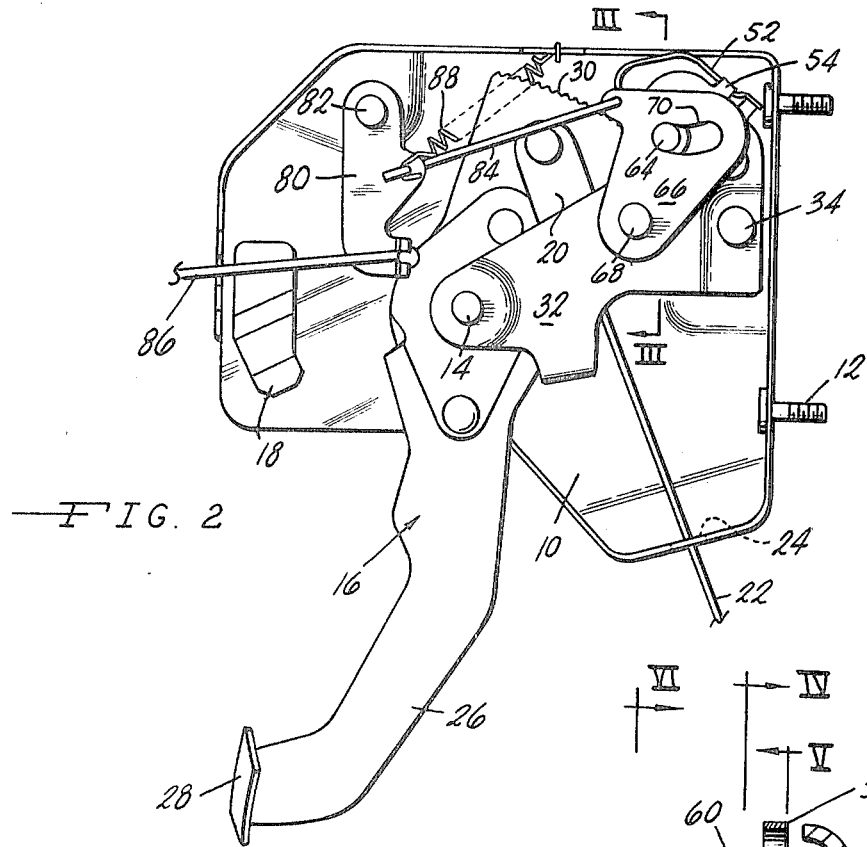
FIG. 2 is a view of the opposite side of the brake actuator of FIG. 1.

The configuration of the two-part actuating lever 16 will be appreciated from FIGS. 1 and 2, and includes a downwardly extending portion 26 having a foot plate 28 welded thereto wherein pressure applied to the foot plate will pivot the lever 16 to the brake parking or setting position shown in these figures wherein cable 22 is tensioned. The actuating lever 16 also includes a plurality of ratchet teeth 30 having a configuration best appreciated from FIGS. 7 and 8. The set of ratchet teeth 30 are concentric to the lever pivot 14, and are of such circumferential length as to permit the desired arc of movement of the lever required to produce sufficient tension in the brake cable 22 to operate the vehicle rear wheel brakes.

In the disclosed embodiment a support plate auxiliary plate 32 is fixed to support plate 10 by the pivot pin 14, and a rivet 34. In this manner the plate 32 is fixed relative to the support plate 10, and the pawl structure is mounted upon this component.

Figure 5:
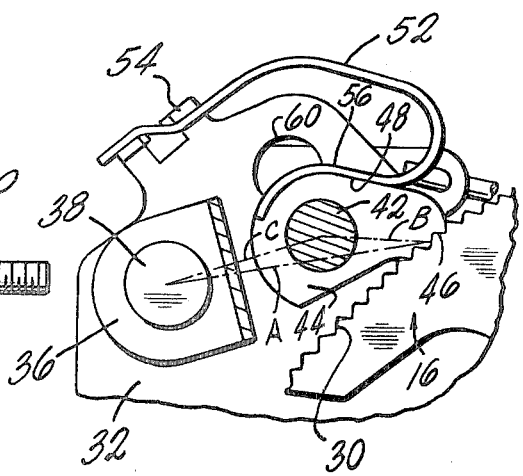
FIG. 5 is an enlarged, detail, elevational, sectional view of the pawl mechanism taken along section V—V of FIG. 3.
Figure 3:
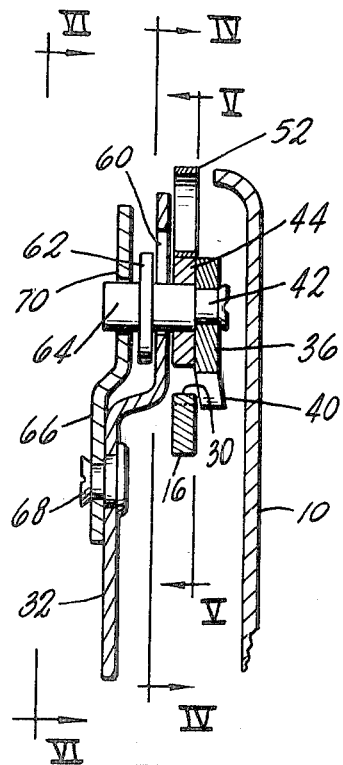
FIG. 3 is a detail, elevational, sectional view taken along section III—III of FIG. 2.

With reference to FIGS. 1, 3 and 5, the pawl structure includes the pawl support lever 36 which is pivotally mounted on the auxiliary plate 32 by a pivot pin 38. The support lever 36 includes an extension 40 which is deformed from the plane of the lever to function as a guide with respect to the association of the lever 16 with the pawl. The support lever 36 has a pivot pin 42 mounted thereon, radially spaced from pivot 38, adapted to move toward and away from the lever ratchet teeth 30 as lever 36 is pivoted.

The pawl 44, FIG. 5, is pivotally mounted upon the pivot pin 42, and the pawl includes three teeth 46 for cooperation with the lever ratchet teeth 30. Additionally, the pawl includes a spring engaging surface 48, and a spring end engaging shoulder 50.

A flat wire spring 52, FIG. 5, is attached, at one end, to the plate 32 by L-shaped fingers 54, and is of the illustrated configuration wherein a portion 56 of the spring contacts the pawl surface 48, and the end 58 of the spring engages the pawl shoulder 50. In this manner, the spring end 58 engaging shoulder 50 and the engagement of the pawl surface 48 with the spring portion 56 positions the pawl to a "normal" position with respect to pivot 42, as shown in FIG. 8. Additionally, the spring 52 imposes a downward biasing force on the pawl, FIG. 5, which tends to pivot the pawl support lever 36 toward the lever ratchet teeth 30.

The pivot pin 42 extends through a slot 60 defined in the plate 32, and includes an enlarged radial collar 62 disposed adjacent the plate 32 on the opposite side thereof with respect to the pawl 44. In this manner the pin 42 receives outboard support and orientation, and the pin is provided with an extension 64 which is received within the release lever mechanism cam slot as will be later described.

Figure 6:
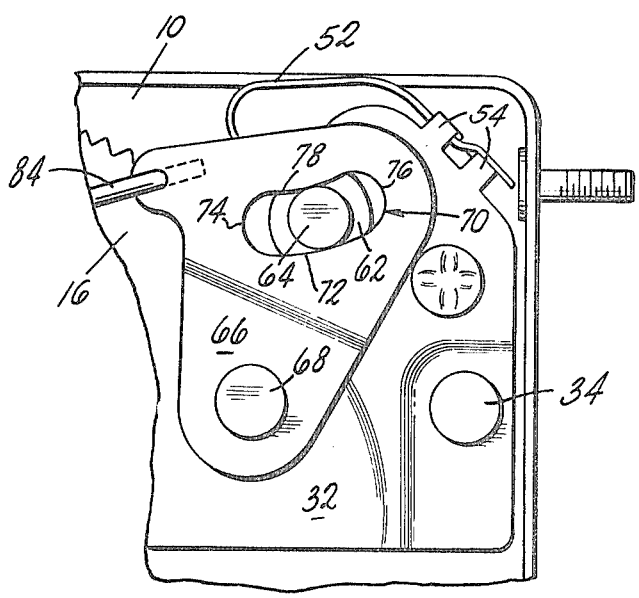
FIG. 6 is an elevational, detail view illustrating the release lever in a partially pawl release condition as taken along section VI—VI of FIG. 3.

The release lever 66 is best illustrated in FIGS. 2 and 6, and is pivotally mounted on the auxiliary support plate 32 by a pivot pin 68. The release lever 66 includes a kidney-shaped cam slot 70 which receives the extension 64 of the pivot pin 42. The cam slot 70 includes a surface 72 which is inclined with respect to a line interconnecting the center lines of the pivots 68 and 42, and this surface produces the movement of the pawl support lever and pawl during the unlocking of the pawl from the lever ratchet teeth. Additionally, the cam slot includes terminating ends 74 and 76 and the surface 78 functions to prevent pivoting of the pawl and pawl support lever away from the ratchet teeth 30 when the pawl is in a locking relationship with the ratchet teeth.

As will be apparent in FIGS. 1 and 2, the release lever 66 is connected by link 84 to a lever 80, which is pivotally mounted upon the support plate 10 by a pivot pin 82, and the lever 80 will usually be directly connected to the manually operated brake release lever or handle, not shown, by the operating member 86. A spring 88 is interposed between plate 10 and lever 80 to impose a counterclockwise force on lever 80. The lever 80 is pivoted in a clockwise direction, FIG. 2, during operation for releasing the parking brake, and this movement is transferred to the release locking lever 66 by the connecting link 84 to cause a counterclockwise rotation of the release lever, FIG. 2.

As will be appreciated from FIG. 3, the ratchet teeth segment portion of the lever 16 is received between the pawl support lever extension 40 and the auxiliary plate 32.

When it is desired to set or lock the parking brake, the operator depresses the foot plate 28 to rotate the lever 16 to the position shown in FIGS. 1 and 2. During this operation the release lever 66 will be in the position shown and illustrated in FIG. 2, and the pawl teeth 46 will ride or idle over the lever ratchet teeth 30. During this "idling" of the pawl 44 the surface 48 of the pawl will be engaging the spring portion 56, which will bias the pawl teeth 46 toward teeth 30.

Once the proper tension on the brake cable 22 has been achieved, the operator removes his foot from the footplate 28, and the engagement of the pawl 44 with the ratchet teeth 30 will maintain the lever 16 in the desired angular position locked against the brake cable tension. As will be appreciated from FIG. 5, which illustrates the locked condition, a triangular relationship as represented by lines A, B and C between the pawl teeth 46, the pivot pin 42 and the pivot pin 38 can be considered to exist, the line of force being along lines B and C. The forces along lines B and C during locking are compression forces and the length of A is only slightly less than the sum of B and C, yet the pivotal mounting of the pawl 44 upon the lever 36 permits three pawl teeth to be utilized, each of which has a full and effective engagement with a separate ratchet tooth 30 on the lever.

From FIG. 5 it is also appreciated that the line of force between the teeth 46 and pivot 42, line B, and the line of force between pivot 42 and pivot 38, line C, define an obtuse angle approaching 180°. Thus, the compression forces on the pawl will be substantially directed toward pivot 38, but there will be a small force imposed on pivot 42 in an upward direction, which aids in the release operation. Movement of the pivot upwardly is prevented by engagement of extension 64 with the cam slot surface 78, and, as shown in FIG. 2, the extension 64 will be adjacent slot end 74 when the pawl is in the locking condition.

When it is desired to release the parking brake the operator actuates the operating member 86, either directly or indirectly, to pivot the lever 80 in a clockwise direction, FIG. 2, which causes a counterclockwise pivoting of the release lever 66. This pivotal movement of the release lever causes the cam surface 72 to slide under the pivot extension 64 and lift the pivot 42 in slot 60 and thereby pivot the pawl support lever 36 in a counterclockwise direction, FIGS. 1 and 5, away from the lever ratchet teeth 30. As the lever 36 pivots in this direction the angle defined by lines B and C decreases, which aids in producing the releasing motion since the tension in the brake cable 22 thereby contributes to the pivoting of the lever 36.

As the pawl support lever 36 rotates in a counterclockwise direction, FIG. 7, the pawl 44 will rotate on the pivot 42 in a clockwise direction, and thereby tend to "unroll" with respect to the segment teeth 30. This unrolling or rotational movement between the pawl and ratchet teeth minimizes the frictional wear occurring between these teeth during unlocking, as well as aids in facilitating the aforedescribed movement of the lever 36. As the pawl 44 is rotated in a clockwise direction during this motion, FIG. 7, the pawl shoulder 50 engages the end 58 of the spring causing the spring to be distorted disengaging surface 48 and spring portion 56 as will be appreciated in FIG. 7.

FIG. 8 illustrates the relationship of the components after the lever 36 has lifted sufficiently to permit the pawl teeth 46 to clear the lever teeth 30, and under these conditions the actuating lever 16 is free to fully rotate to its "off" position wherein the lever will engage the rubber bumper stop 18, and release the tension in the brake cable 22, releasing the parking brakes. As soon as the pawl 44 clears the ratchet teeth 30, the spring 52 will pivot the pawl to its "normal" position shown in FIG. 8 due to the counterclockwise biasing force exerted on the pawl by the end 58.

When the operator releases the operating member 86 the biasing force exerted on the lever 36 by spring 52 will cause the release lever 66 to pivot to the position shown in FIG. 2. This movement is augmented by spring 88, and the pawl teeth 46 will rest lightly upon the ratchet teeth 30 in a position to "idle" over the ratchet teeth during the next cycle of parking brake lever actuation. It is to be noted that when the lever 16 is being "set" the pivot 42 is in its "lowest" position, FIG. 5, as the pawl idles over the teeth 30. Thus, as soon as the foot pressure on plate 28 is released, the pawl will engage and hold the lever 30 with no "play" or "back off" to permit the pawl teeth 46 to engage teeth 30, yet, when the pawl is being released the pawl teeth "unroll" from the lever teeth 30. Thus, the mode of tooth engagement and disengagement between pawl and actuating lever differs depending on whether the actuating lever is being locked or released.

The toggle type mounting of the pawl 44 thereby produces several advantages, as described above, with respect to the holding and the releasing of the lever 16. The increased life, minimizing of pawl and ratchet tooth wear, and the minimizing of the force necessary to release the pawl from the ratchet teeth all contribute to produce an improved brake actuator.

It is appreciated that various modifications to the disclosed embodiment may be apparent to those skilled in the art without departing from the scope of the invention.

What is claimed is:

1. A brake actuator comprising, in combination, a support member, a ratchet lever mounted on said support member for pivotal movement about an axis, a plurality of ratchet teeth defined on said lever radially spaced from said axis, an operating portion defined on said lever for producing pivoting thereof, a pawl having teeth defined thereon for selectively engaging said lever ratchet teeth, a pawl support movably mounted on said support member having a portion substantially radially movable with respect to said axis for movement toward and away from said lever ratchet teeth, pivot means pivotally mounting said pawl upon said pawl support portion having an axis substantially parallel to said lever pivotal axis, spring means biasing said pawl in a pivotal direction for engaging the teeth of said pawl with said lever ratchet teeth, release means movably mounted on said support member connected to said pawl support selectively controlling movement of said pawl support portion and pawl toward and away from said lever ratchet teeth, and brake control means connected to said ratchet lever.

2. A brake actuator as in claim 1 wherein said pawl support comprises a lever pivoted about an axis substantially parallel to said pawl and ratchet lever pivot axes.

3. A brake actuator as in claim 2 wherein said spring means imposes a biasing force on said pawl support lever in a direction biasing said pawl toward said lever ratchet teeth.

4. A brake actuator as in claim 1 wherein said release means comprises a lever pivotally mounted on said support member, a cam surface defined on said release means lever, and a cam follower mounted on said pawl support adapted to be engaged by said cam surface whereby pivotal movement of said release means lever controls movement of said pawl support and pawl with respect to said ratchet teeth.

5. A brake actuator comprising, in combination, a support member, an actuating lever mounted on said support member for pivotal movement about an axis, a plurality of ratchet teeth defined on said lever substantially concentric to said axis and radially spaced therefrom, an operating portion defined on said lever for producing pivoting thereof, a pawl support lever movably mounted on said support member for pivotal movement about a first pivot axis radially spaced from said actuating lever axis, a pawl movably mounted on pawl support for pivotal movement about a second pivot axis, said lever, first and second axes being substantially parallel, teeth defined on said pawl for selective engagement with said lever ratchet teeth, release means movably mounted on said support member connected to said pawl support lever for pivoting said pawl support lever about said first axis to move said pawl and second axis relative to said lever ratchet teeth, said first axis, second axis and pawl teeth approaching a linear alignment upon said pawl teeth engaging said ratchet teeth in a locking relationship, and brake control means connected to said ratchet lever.

6. A brake actuator as in claim 5 wherein said release means includes retaining means retaining said pawl support lever in the position wherein said pawl locks said actuating lever.

7. A brake actuator as in claim 5, including spring means engaging said pawl biasing said pawl teeth toward said actuating lever ratchet teeth.

8. A brake actuator as in claim 7 wherein said spring means simultaneously biases said pawl support lever in a direction to move said pawl toward said lever ratchet teeth.

9. A brake actuator as in claim 8 wherein said spring means comprises a spring having a pawl orientating portion and a free end, a pawl orientating surface defined on said pawl normally engaged by said spring portion, an abutment defined on said pawl radially spaced from said second axis normally engageable by said spring free end, said spring portion and end maintaining said pawl in a normal orientation relative to said second axis and biasing said pawl toward said normal position upon said pawl rotating about said second axis from said normal position.

10. A brake actuator as in claim 5 wherein said release means comprises a lever pivotally mounted on said support member, a pawl supporting lever operating cam surface defined on said release means lever and cam follower means defined on said pawl support lever engaging said cam surface.

11. A brake actuator as in claim 10, a slot defined in said release means lever, said cam surface constituting a portion of said slot, a cam follower retaining surface constituting a portion of said slot disposed in opposed relationship to said cam surface engageable by said cam follower to retain said pawl support lever in the position wherein said pawl locks said actuating lever.

12. A brake actuator as in claim 11 wherein said cam follower comprises a pivot pin mounted in said pawl support lever defining said second axis.

13. A brake actuator comprising, in combination, a support member, a ratchet lever mounted on said support member for pivotal movement about a first axis, tension brake control means connected to said lever, a plurality of ratchet teeth defined on said lever radially spaced from said first axis, an operating portion defined on said lever for producing pivoting thereof, a pawl support lever pivotally mounted on said support member for pivotal movement about a second axis substantially parallel to said first axis and radially spaced therefrom, said ratchet teeth moving toward said second axis to release said brake control means and moving away from said second axis to tension said brake control means, a pawl pivot mounted on said pawl support lever, a pawl pivotally supported upon said pawl pivot, teeth defined on said pawl for selective engagement with said ratchet teeth, said pawl pivot being located intermediate said pawl teeth and said second axis upon said pawl teeth engaging said ratchet teeth to maintain said ratchet lever in a brake control tensioning condition, and release means controlling pivoting of said pawl support lever about said second axis, pivoting of said pawl support lever about said second axis to move said pawl away from said ratchet teeth causing rotation of said pawl about said pawl pivot producing an initial rotary unrolling disengagement between said ratchet lever and pawl teeth.

14. A brake actuator as in claim 13, a spring interposed between said pawl and said support member biasing said pawl and pawl pivot toward said ratchet teeth, spring engaging surfaces defined on said pawl, said spring engaging said surfaces to resiliently maintain said pawl in a predetermined angular position with respect to said pawl pivot.

* * * * *